(12) United States Patent
Ogino

(10) Patent No.: US 7,821,606 B2
(45) Date of Patent: Oct. 26, 2010

(54) LCD DEVICE HAVING COMMON AND PIXEL ELECTRODES ON FIRST SUBSTRATE AND SHIELD ELECTRODE, RESIN COLOR FILTER LAYER WITH RESIN OVERCOAT LAYER ON SECOND SUBSTRATE

(75) Inventor: Takaharu Ogino, Ishikawa-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 359 days.

(21) Appl. No.: 11/944,008

(22) Filed: Nov. 21, 2007

(65) Prior Publication Data

US 2008/0117372 A1   May 22, 2008

(30) Foreign Application Priority Data

Nov. 22, 2006   (JP) .............................. 2006-315544

(51) Int. Cl.
*G02F 1/1343* (2006.01)

(52) U.S. Cl. .................. 349/141; 349/40; 349/138; 349/106

(58) Field of Classification Search .................. 349/40, 349/141, 106–109, 138
See application file for complete search history.

(56) References Cited

U.S. PATENT DOCUMENTS

| 6,064,451 | A  | * | 5/2000 | Oh et al. ....................... 349/40 |
| 6,734,939 | B2 | * | 5/2004 | Lee et al. ..................... 349/141 |
| 7,190,429 | B2 | * | 3/2007 | Yoshida et al. ............... 349/141 |
| 2005/0280635 | A1 | * | 12/2005 | Hinata ........................ 345/173 |
| 2006/0023135 | A1 | * | 2/2006 | Park ............................. 349/40 |

FOREIGN PATENT DOCUMENTS

| JP | 2005-107535 | 4/2005 |
| JP | 2006-139295 | 6/2006 |

* cited by examiner

*Primary Examiner*—John Heyman
(74) *Attorney, Agent, or Firm*—Oblon, Spivak, McClelland, Maier & Neustadt, L.L.P.

(57) ABSTRACT

A liquid crystal display device includes a liquid crystal display panel which is configured to hold a liquid crystal layer between an array substrate and a counter-substrate. The array substrate includes, on an insulating substrate, a switching element which is disposed in association with each of pixels, a pixel electrode which is connected to the switching element, and a common electrode which is separated from the pixel electrode and is common to the pixels. The counter-substrate includes a shield electrode disposed on an inner surface of an insulating substrate, which is opposed to the liquid crystal layer, and a dielectric layer disposed between the shield electrode and the liquid crystal layer.

6 Claims, 7 Drawing Sheets

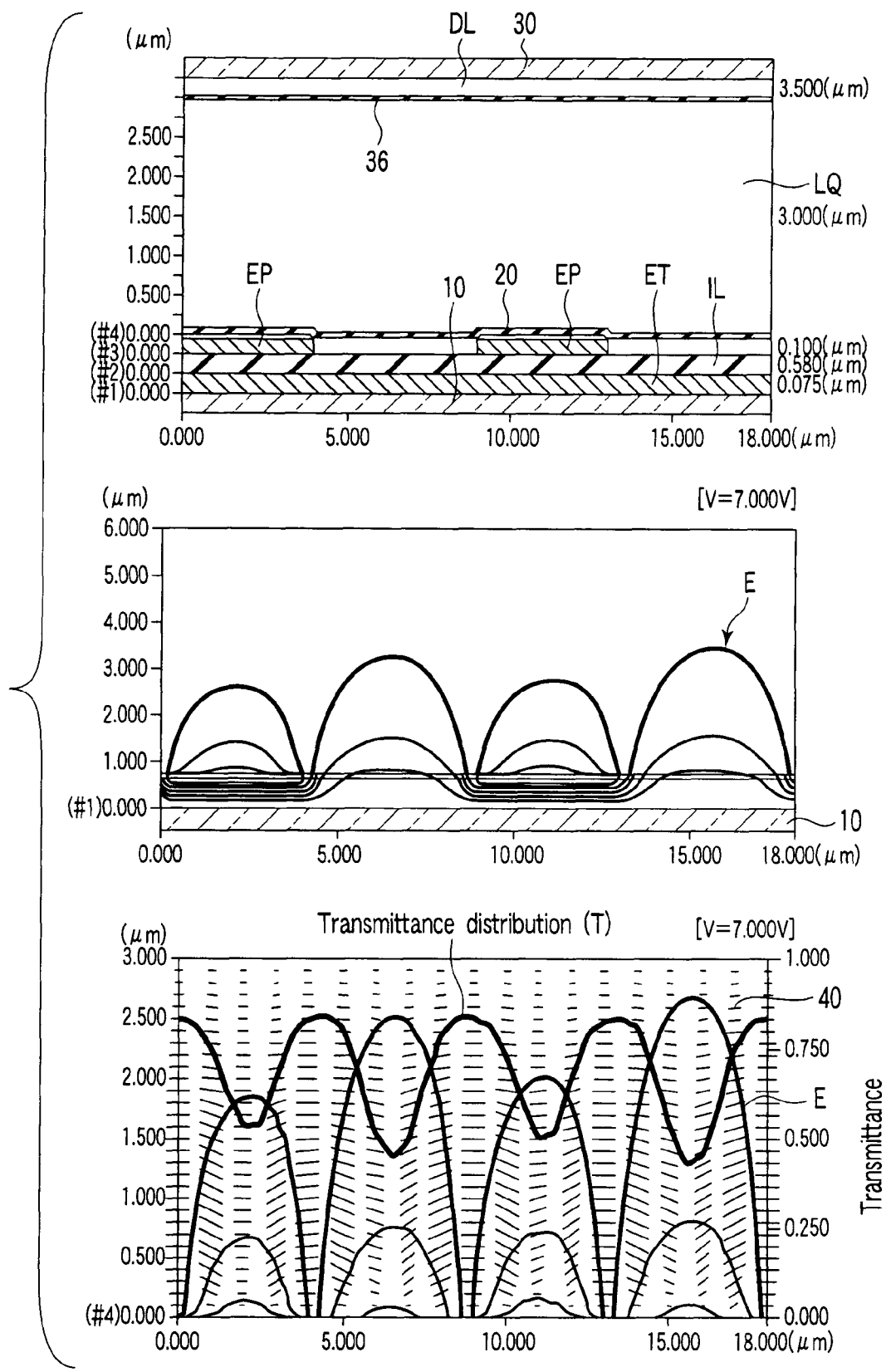
F I G. 3

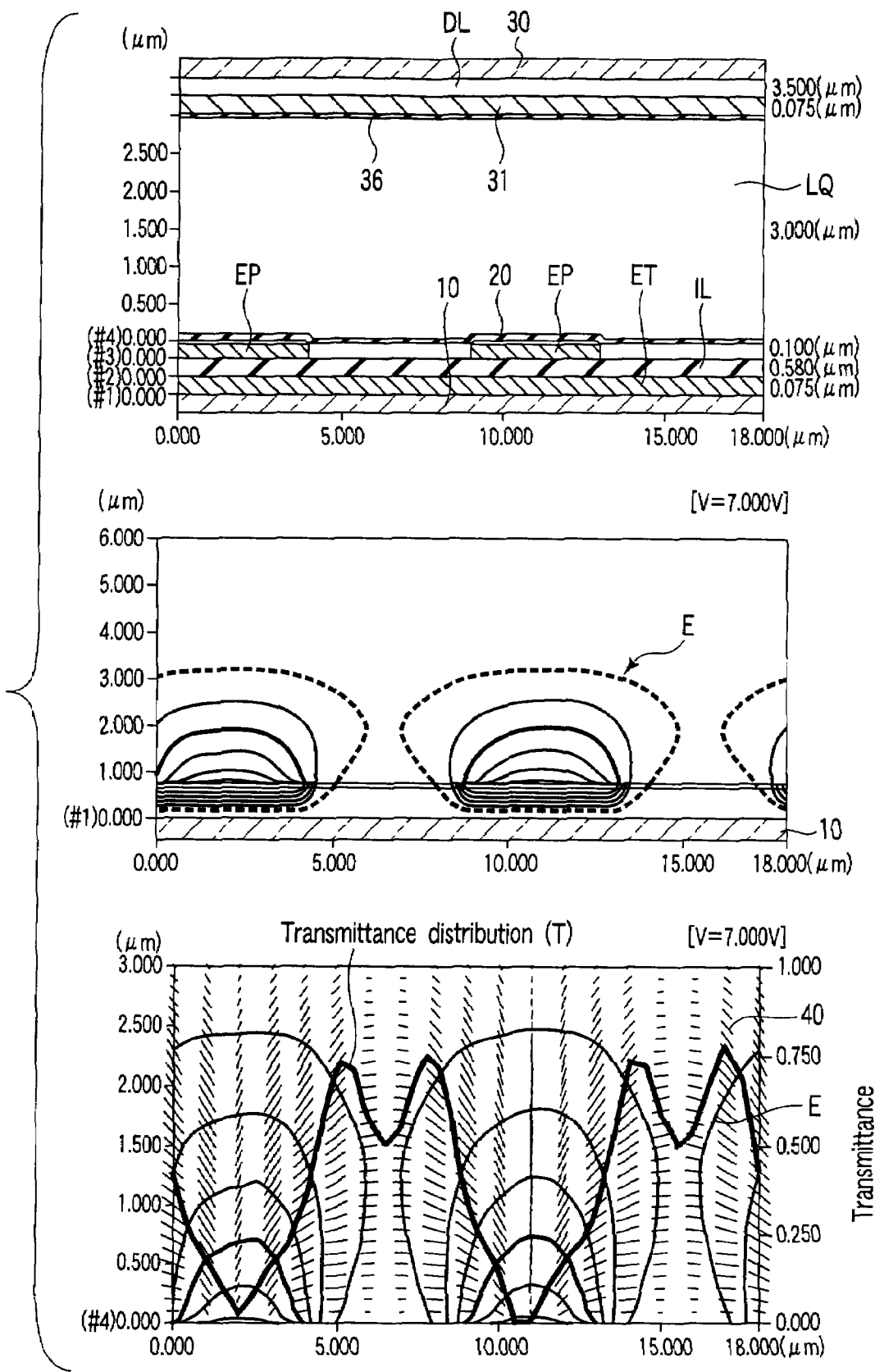
F I G. 4

LCD DEVICE HAVING COMMON AND PIXEL ELECTRODES ON FIRST SUBSTRATE AND SHIELD ELECTRODE, RESIN COLOR FILTER LAYER WITH RESIN OVERCOAT LAYER ON SECOND SUBSTRATE

CROSS-REFERENCE TO RELATED APPLICATIONS

This application is based upon and claims the benefit of priority from prior Japanese Patent Application No. 2006-315544, filed Nov. 22, 2006, the entire contents of which are incorporated herein by reference.

BACKGROUND OF THE INVENTION

1. Field of the Invention

The present invention relates generally to a liquid crystal display device, and more particularly to a liquid crystal display device having such a structure that a pixel electrode and a common electrode are provided on one of substrates that constitute a liquid crystal display panel.

2. Description of the Related Art

In recent years, flat-panel display devices, which replace CRT displays, have vigorously been developed, and liquid crystal display device, above all, have attracted attention because of advantages of light weight, small thickness and low power consumption. In particular, in an active matrix liquid crystal display device in which a switching element is provided in each of pixels, attention has been paid to the structure which makes use of a transverse electric field (including a fringe electric field) of an IPS (In-Plane Switching) mode or an FFS (Fringe Field Switching) mode (see, for instance, Jpn. Pat. Appln. KOKAI Publication No. 2005-107535 and Jpn. Pat. Appln. KOKAI Publication No. 2006-139295).

The liquid crystal display device of the IPS mode or FFS mode includes a pixel electrode and a common electrode which are formed on an array substrate, and liquid crystal molecules are switched by a transverse electric field that is substantially parallel to the major surface of the array substrate. In addition, polarizer plates, which are disposed such that their axes of polarization intersect at right angles, are disposed on the outer surfaces of the array substrate and the counter-substrate. By this disposition of the polarizer plates, a black screen is displayed, for example, at a time of non-application of voltage. With the application of a voltage corresponding to a video signal to the pixel electrode, the light transmittance (modulation ratio) gradually increases and a white screen is displayed. In this liquid crystal display device, the liquid crystal molecules rotate in a plane that is substantially parallel to the major surface of the substrate. Thus, since the polarization state is not greatly affected by the direction of incidence of transmissive light, there is the feature that the viewing angle dependency is low and a wide viewing angle characteristic is obtained.

In this liquid crystal display device that makes use of the transverse electric field, the counter-substrate is in an electrically floating state. Thus, there is no escape path for static electricity that has come from the counter-electrode side, and the static electricity that is charged in the counter-electrode stays there and may disturb the transverse electric field that is produced on the array substrate side (or a vertical electric field may be produced). Owing to such abnormality in the transverse electric field, a display defect may be caused.

BRIEF SUMMARY OF THE INVENTION

The present invention has been made in consideration of the above-described problem, and the object of the invention is to provide a liquid crystal display device which can display an image with high display quality.

According to an aspect of the present invention, there is provided a liquid crystal display device comprising a liquid crystal display panel which is configured to hold a liquid crystal layer between a first substrate and a second substrate, wherein the first substrate includes, on an insulating substrate, a switching element which is disposed in association with each of pixels, a pixel electrode which is connected to the switching element, and a common electrode which is separated from the pixel electrode and is common to the pixels, and the second substrate includes a shield electrode disposed on an inner surface of an insulating substrate, which is opposed to the liquid crystal layer, and a dielectric layer disposed between the shield electrode and the liquid crystal layer.

The present invention can provide a liquid crystal display device which can display an image with high display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows a cross section of an FFS mode liquid crystal display panel according to a first example of structure, an electric field distribution in this liquid crystal display panel, and a relationship between an electric field distribution, an alignment distribution and a transmittance distribution in a liquid crystal layer;

FIG. 4 shows a cross section of an FFS mode liquid crystal display panel according to a second example of structure, an electric field distribution in this liquid crystal display panel, and a relationship between an electric field distribution, an alignment distribution and a transmittance distribution in a liquid crystal layer;

DETAILED DESCRIPTION OF THE INVENTION

A liquid crystal display device according to an embodiment of the present invention will now be described with reference to the accompanying drawings. Although an FFS mode liquid crystal display device is described below as an example of the liquid crystal display device, the same advantageous effects as the present embodiment can be obtained if the same counter-substrate structure as in the present embodiment is adopted with respect to a liquid crystal display device of another liquid crystal mode, such as an IPS mode, in which a pixel electrode and a common electrode are provided on one of substrates and liquid crystal molecules are switched by mainly using a transverse electric field that is produced between the substrates.

Figure 1:
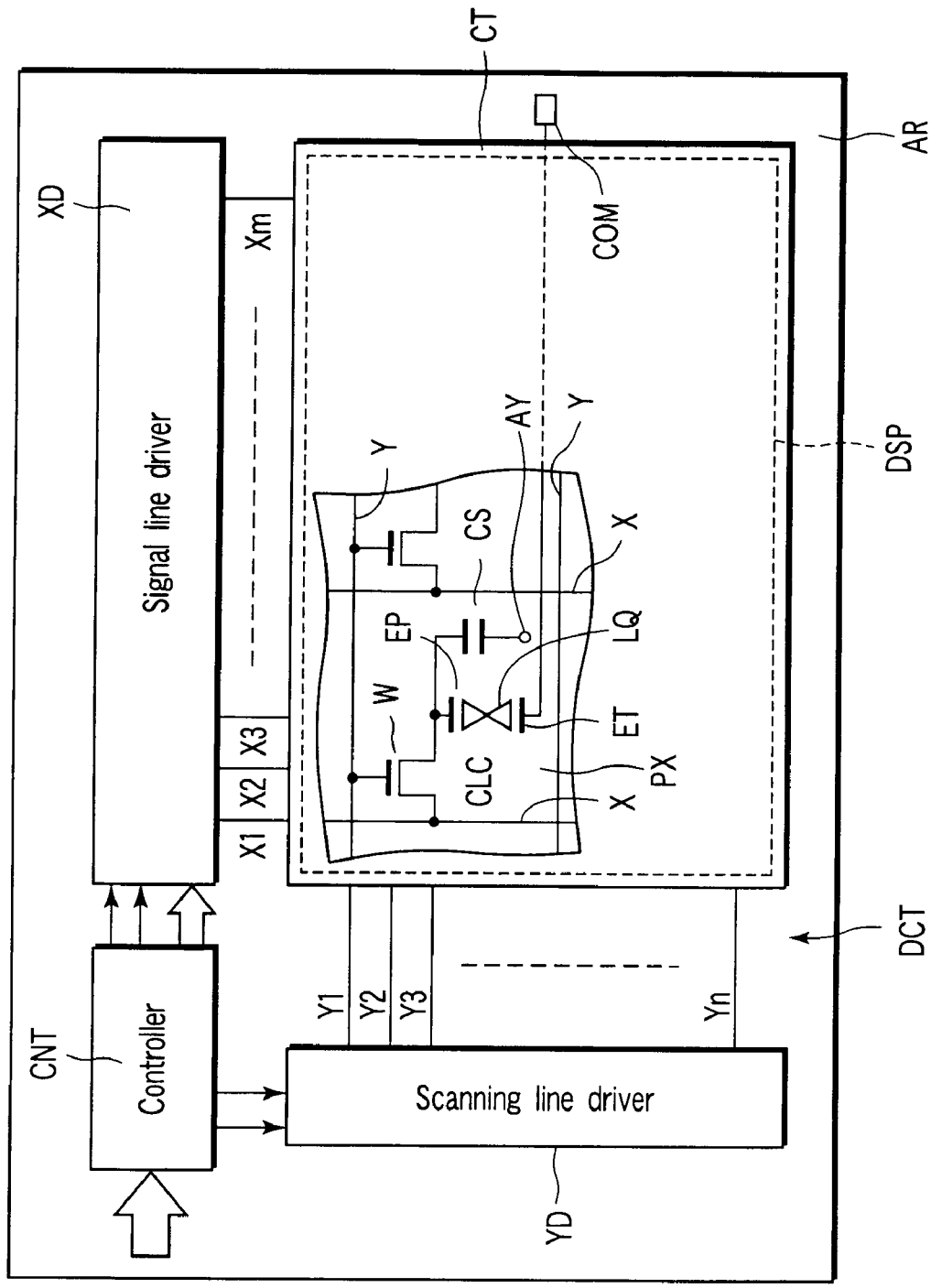
FIG. 1 schematically shows the structure of a liquid crystal display device of a liquid crystal mode which makes use of a transverse electric field according to an embodiment of the present invention.
Figure 2:
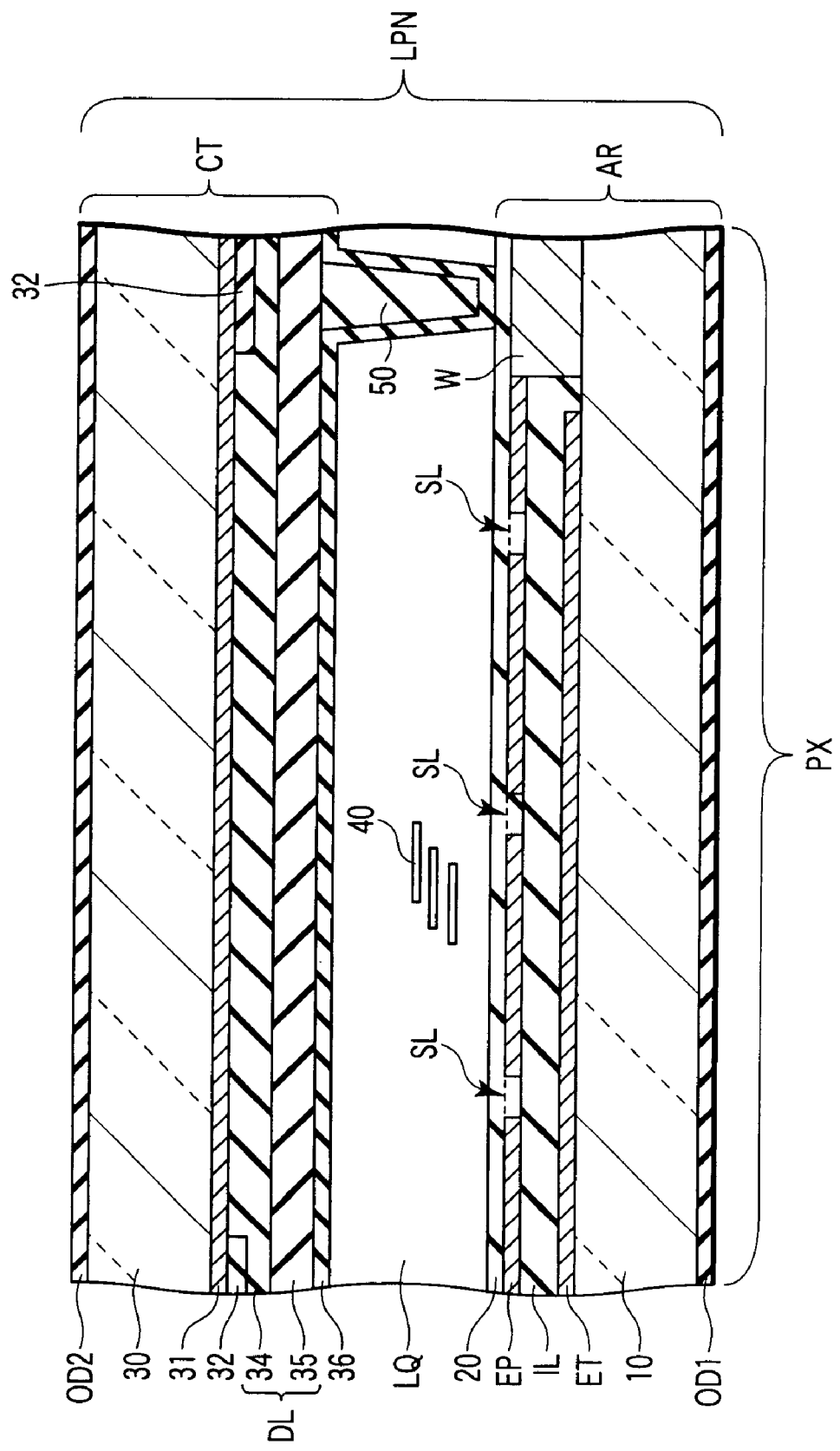
FIG. 2 schematically shows a cross-sectional structure of one pixel in the liquid crystal display device shown in FIG. 1.

As is shown in FIG. 1 and FIG. 2, the liquid crystal display device is an active matrix type liquid crystal display device, and includes a liquid crystal display panel LPN. The liquid crystal display panel LPN is configured to include an array substrate (first substrate) AR, a counter-substrate (second substrate) CT which is disposed to be opposed to the array substrate AR, and a liquid crystal layer LQ which is held between the array substrate AR and the counter-substrate CT. This liquid crystal display device includes a display region DSP which displays an image. The display region DSP is composed of a plurality of pixels PX which are arranged in a matrix of m×n.

The array substrate AR is formed by using an insulating substrate 10 with light transmissivity, such as a glass plate or a quartz plate. Specifically, the array substrate AR includes, in the display region DSP, an (m×n) number of pixel electrodes EP which are disposed in association with individual pixels; an n-number of scanning lines Y (Y1 to Yn) which are formed along rows of pixels; an m-number of signal lines X (X1 to Xn) which are formed along columns of pixels; an (m×n) number of switching elements W which are disposed in regions including intersections between the scanning lines Y and signal lines X in the respective pixels PX; a storage capacitance line AY which is capacitive-coupled to each pixel electrode EP so as to constitute a storage capacitance CS in parallel with a liquid crystal capacitance CLC; and a common electrode ET which is disposed apart from the pixel electrode EP.

The array substrate AR further includes, in a driving circuit region DCT around the display region DSP, at least a part of a scanning line driver YD which is connected to the n-number of scanning lines Y, and at least a part of a signal line driver XD which is connected to the m-number of signal lines X. The scanning line driver YD successively supplies a scanning signal to the n-number of scanning lines Y on the basis of the control by a controller CNT. The signal line driver XD supplies video signals to the m-number of signal lines X on the basis of the control by the controller CNT at a timing when the switching elements W of each row are turned on by the scanning signal. Thereby, the pixel electrodes EP of each row are set at pixel potentials corresponding to the video signals that are supplied via the associated switching elements W.

Each of the switching elements W is composed of, e.g. a thin-film transistor. The semiconductor layer of the switching element W can be formed of, e.g. polysilicon or amorphous silicon. The gate electrode of the switching element W is connected to the scanning line Y (or formed integral with the scanning line Y). The source electrode of the switching element W is connected to the signal line X (or formed integral with the signal line X) and is put in contact with a source region of the semiconductor layer. The drain electrode of the switching element W is connected to the pixel electrode EP (or formed integral with the pixel electrode EP) and is put in contact with a drain region of the semiconductor layer.

The common electrode ET is disposed, for example, in an insular shape in each of the pixels PX, and is connected to a common wiring line COM of a common potential. The pixel electrode EP is disposed to be opposed to the common electrode ET via an insulation layer IL. The pixel electrode EP has a plurality of slits SL which are opposed to the common electrode ET. The pixel electrode EP and common electrode ET are formed of a light-transmissive electrically conductive material such as indium tin oxide (ITO) or indium zinc oxide (IZO). That surface of the array substrate AR, which is in contact with the liquid crystal layer LQ, is covered with an alignment film 20.

On the other hand, the counter-electrode CT is formed by using an insulating substrate 30 with light transmissivity, such as a glass plate or a quartz plate. Specifically, the counter-substrate CT includes a shield electrode 31 on an inner surface of the insulating substrate 30, that is, a surface opposed to the liquid crystal layer LQ. In the display region DSP, the counter-substrate CT includes a black matrix which divides the pixels PX. Further, the counter-substrate CT includes, in the display region DSP, a dielectric layer DL between the shield electrode 31 and the liquid crystal layer LQ. In this embodiment, the counter-substrate CT includes, as the dielectric layer DL, a color filter layer 34 which is disposed in each pixel surrounded by the black matrix 32, and an overcoat layer 35 which covers the color filter layer 34.

The shield electrode 31 is formed of a light-transmissive electrically conductive material such as ITO or IZO. The black matrix 32 is disposed on the shield electrode 31 so as to be opposed to the scanning lines Y and signal lines X and wiring portions of the switching elements W, etc., which are provided on the array substrate AR.

The color filter layer 34 is disposed on the shield electrode 31 and is formed of color resins of different colors, for example, the three primary colors of red, blue and green. The red color resin, blue color resin and green color resin are disposed in association with a red pixel, a blue pixel and a green pixel, respectively. The color resins can be obtained by dispersing pigments in polyimide resins.

The overcoat layer 35 is formed of a light-transmissive non-colored resin, for example, an acrylic or epoxy resin material. The overcoat layer 35 is disposed with such a relatively large thickness as to planarize irregularities on the surface of the color filter layer 34. That surface of the counter-substrate CT, which is in contact with the liquid crystal layer LQ, is covered with an alignment film 36.

When the above-described counter-substrate CT and array substrate AR are disposed such that their alignment films 20 and 36 are opposed to each other, a predetermined gap is created by columnar spacers 50 which are disposed therebetween. The liquid crystal layer LQ is formed of a liquid crystal composition including liquid crystal molecules which are sealed in the gap that is created between the alignment film 20 of the array substrate AR and the alignment film 36 of the counter-substrate CT.

The liquid crystal display device includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ). Each of the optical elements OD1 and OD2 includes a polarizer plate.

By the above-described structure, backlight from a backlight unit BL, which is disposed on the array substrate AR side of the liquid crystal display panel LPN, is selectively passed through the liquid crystal display panel LPN, and an image is displayed.

According to the above-described structure, the shield electrode 31 is disposed on the counter-substrate CT side. Thereby, static electricity, which comes in from the counter-substrate side, can be shielded, and disturbance of a transverse electric field, which is produced between the pixel electrode EP and the common electrode ET, can be relaxed. Therefore, an image with good display quality can be displayed by making use of the transverse electric field.

Besides, in recent years, there has been an increasing demand for the reduction in thickness of the liquid crystal display panel LPN. In order to meet this demand, there is a case in which the insulating substrates that constitute the array substrate AR and counter-electrode CT are polished. This polishing step is performed after the array substrate AR and the counter-substrate CT are attached by a seal member (not shown). In the case where the shield electrode is disposed on the outer surface of the counter-substrate CT (i.e. that surface of the insulating substrate 30, on which the optical element OD2 is disposed), the shield electrode, as well as the insulating substrate 30, is removed by the polishing step. Thus, there is no need to dispose the shield electrode prior to the polishing step. In this case, the countermeasure to static electricity in the fabrication process becomes inadequate. It is also thinkable to dispose the shield electrode on the outer surface of the counter-substrate CT after the polishing step. However, the shield electrode is formed by forming a film of, e.g. ITO in a vacuum at high temperatures. In other words, since the array substrate AR and the counter-substrate CT are exposed to a high-temperature vacuum atmosphere, the seal member of epoxy resin and the resin material of the color filters, for instance, may be degraded and peeling may occur at the interface of resins or within the resins. As a result, it becomes difficult to dispose the shield electrode on the outer surface of the counter-substrate CT of the cell structure after the polishing step, and it is difficult to reduce the thickness of the liquid crystal display panel LPN for which the countermeasure to static electricity has been taken.

By contrast, according to the structure of the present embodiment, the shield electrode 31 is disposed on the inner surface of the counter-substrate CT. Thus, by carrying out the polishing step after attaching the array substrate AR and counter-substrate CT, the thickness of the insulating substrate 10 that constitutes the array substrate AR and the thickness of the insulating substrate 30 that constitutes the counter-substrate CT can be reduced. Thereby, the thickness of the liquid crystal display panel LPN, for which the countermeasure to static electricity has been taken, can be reduced. The thickness of the insulating substrate 30 of the counter-substrate CT, which has been reduced, is, e.g. 0.1 to 0.5 mm.

In the above-described structure, the shield electrode 31 may be grounded or may be electrically connected to the common electrode ET. In the case where the shield electrode 31 is grounded, it is desirable to ground the shield electrode 31 via a resistor of about 100 kΩ in order to reduce leakage of electric field. In addition, in the case where the shield electrode 31 is connected to the common electrode ET, the shield electrode 31 is connected to the common electrode ET via the common wiring line COM that is led out of the display region DSP and an electrically conductive member (transfer), and a common potential can be supplied to the shield electrode 31.

By the above structure, it becomes possible to provide the counter-substrate CT with a shield effect against static electricity from the outside, and to realize high tolerance to display defects due to the entering of static electricity.

In order to reduce the influence on the transverse electric field that is generated on the array substrate AR side, the shield electrode 31 should preferably be disposed as far as possible from the array substrate AR. However, the thickness of the liquid crystal layer LQ is optimized in accordance with the optical characteristics that are required, and it is difficult to arbitrarily change this thickness. The thickness of the liquid crystal layer (i.e. the gap between the array substrate and the counter-substrate) is set at, e.g. about 3 microns.

In the present embodiment, a sufficient distance is secured between the shield electrode 31 and the array substrate AR by forming the dielectric layer with a relatively large thickness between the shield electrode 31 and the liquid crystal layer LQ. According to the inventor's verification, it was understood that the dielectric layer be designed to have a thickness of 3 microns or more. This verification will be explained below.

Figure 5:
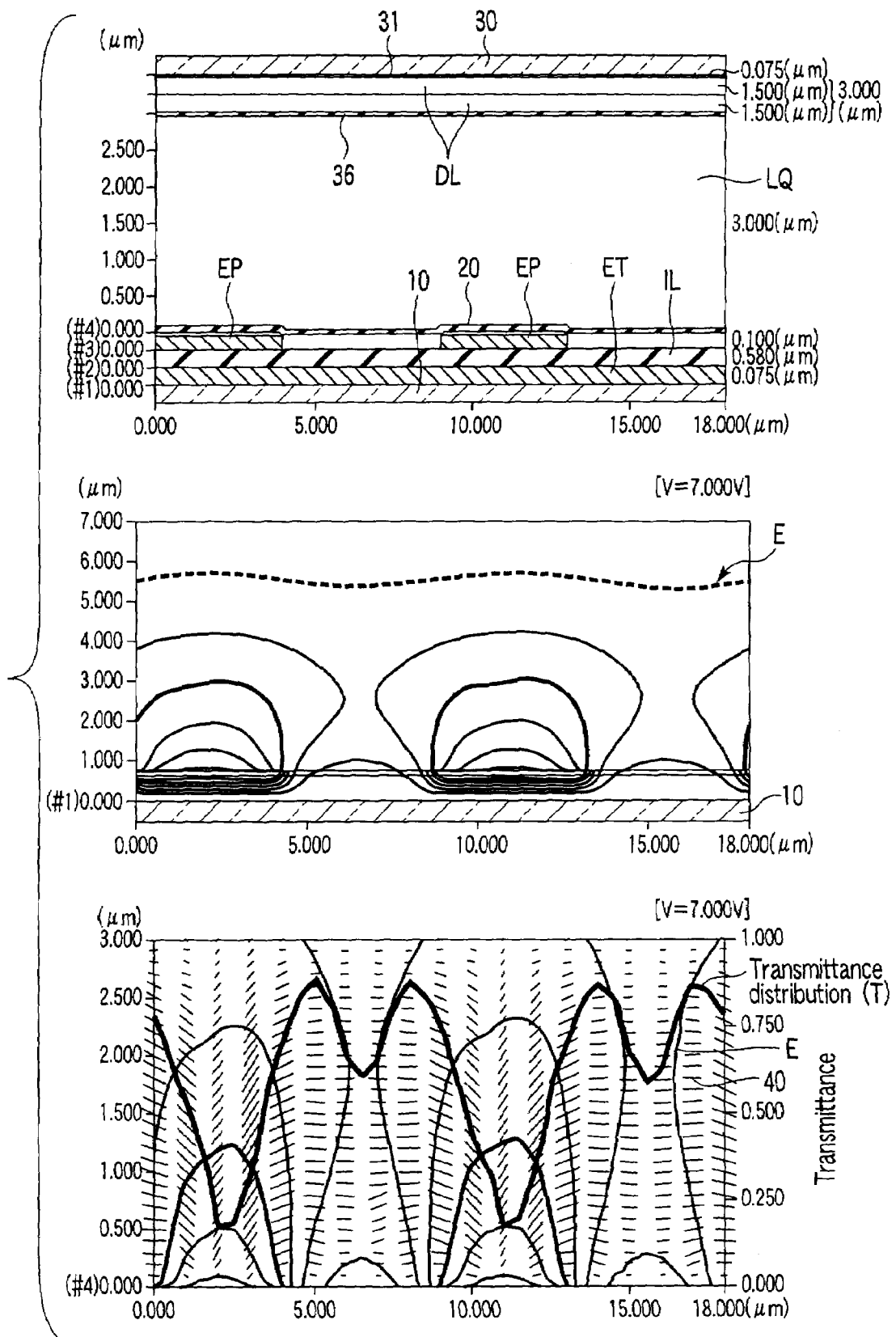
FIG. 5 shows a cross section of an FFS mode liquid crystal display panel according to a third example of structure, an electric field distribution in this liquid crystal display panel, and a relationship between an electric field distribution, an alignment distribution and a transmittance distribution in a liquid crystal layer.

In first to third examples of structure shown in FIG. 3 to FIG. 5, the thickness of the common electrode ET is 0.075 μm, the thickness of the pixel electrode EP is 0.1 μm, the thickness of the insulation layer IL disposed therebetween is 0.58 μm, the thickness of the liquid crystal layer LQ is 3.0 μm, and the thickness of each of the alignment films 20 and 36 is 0.1 μm. In addition, the surface of the insulating substrate 10 is set at (#1) 0.0 μm, the surface of the common electrode ET is set at (#2) 0.0 μm, the surface of the insulating substrate IL is set at (#3) 0.0 μm, and the surface of the pixel electrode EP is set at (#4) 0.0 μm.

FIG. 3 shows a cross section of an FFS mode liquid crystal display panel according to the first example of structure, an electric field distribution (E) in the liquid crystal display panel, and a relationship between the electric field distribution (E), an alignment distribution of liquid crystal molecules 40 and a transmittance distribution (T) within the liquid crystal layer. In the first example of structure, a shield electrode (not shown) is disposed on the outer surface of the insulating substrate 30 that constitutes the counter-substrate CT. A dielectric layer DL, which is composed of at least one of a color filter layer and an overcoat layer, is disposed on the inner surface of the insulating substrate 30. The thickness of the dielectric layer DL is 3.5 μm.

According to the first example of structure, the shield electrode 31 is sufficiently separated from the array substrate AR, and the influence on the transverse electric field E, which is produced on the array substrate AR side, is low. Moreover, the electric field E for driving the liquid crystal molecules can sufficiently be spread in the thickness direction of the liquid crystal layer LQ. Thereby, a high transmittance T is obtained.

FIG. 4 shows a cross section of an FFS mode liquid crystal display panel according to the second example of structure which is designed to realize the reduction in thickness of the substrate, an electric field distribution (E) in the liquid crystal display panel, and a relationship between the electric field distribution (E), an alignment distribution of liquid crystal molecules 40 and a transmittance distribution (T) within the liquid crystal layer. In the second example of structure, the dielectric layer DL is disposed on the inner surface of the insulating substrate 30 that constitutes the counter-substrate CT, and the shield electrode 31 is disposed on the dielectric layer DL. The thickness of the dielectric layer DL is 3.5 μm. The shield electrode 31 is formed to have a thickness of 0.075 μm, and is grounded (V=0).

According to the second example of structure, it is understood that the electric field distribution E of the transverse electric field, which is formed on the array substrate AR side, is weaker than that in the first example of structure shown in FIG. 3. In addition, according to the second example of structure, the transmittance distribution T is lower than that in the first example of structure shown in FIG. 3, and an adequate transmittance for display could not be obtained.

FIG. 5 shows a cross section of an FFS mode liquid crystal display panel according to the third example of structure which is designed to realize the reduction in thickness of the substrate, an electric field distribution (E) in the liquid crystal display panel, and a relationship between the electric field distribution (E), an alignment distribution of liquid crystal molecules 40 and a transmittance distribution (T) within the liquid crystal layer. In the third example of structure, like the above-described embodiment, the shield electrode 31 is disposed on the inner surface of the insulating substrate 30 that constitutes the counter-substrate CT, and the dielectric layer DL is disposed on the shield electrode 31. The shield electrode 31 is formed to have a thickness of 0.075 μm, and is grounded (V=0). The dielectric layer DL is formed to have a thickness of 3.0 μm by stacking a color filter layer with a thickness of 1.5 μm and an overcoat layer with a thickness of 1.5 μm.

According to the third example of structure, it is understood that the electric field distribution E of the transverse electric field, which is formed on the array substrate AR, is weaker than that in the first example of structure shown in FIG. 3, but is improved, compared to that in the second example of structure shown in FIG. 4, and, in particular, that the electric field E for driving the liquid crystal molecules 40 is sufficiently spread in the thickness of the liquid crystal layer LQ. In addition, according to the third example of structure, the transmittance distribution T is lower than that in the first example of structure shown in FIG. 3, but a transmittance which realizes an adequate modulation ratio for display was obtained. It was thus confirmed that the disposition of the shield electrode 31 on the inner surface of the insulating substrate 30 and the disposition of the dielectric layer DL between the shield electrode 31 and the liquid crystal layer LQ are very important in relaxing the influence on the transverse electric field that is generated on the array substrate AR side.

The optimal thickness of the dielectric layer DL, which is to be disposed between the shield electrode 31 and the liquid crystal layer LQ, was studied. A plurality of samples, with different thicknesses of the dielectric layer DL between the shield electrode 31 and the liquid crystal layer LQ, were prepared. With respect to these samples, the modulation ratio (transmittance) in the frontal direction of the liquid crystal display panel, relative to the application voltage between the pixel electrode and the common electrode, was measured. In the measurement, the wavelength of reference light was set at 550 nm.

Sample 1 has no dielectric layer, sample 2 has a dielectric layer DL with a thickness of 3.3 μm, sample 3 has a dielectric layer DL with a thickness of 4.9 μm, and sample 4 has a dielectric layer DL with a thickness of 7.3 μm. The other conditions, for example, the thickness of the liquid crystal layer LQ, were the same. Sample 0 corresponds to the first example of structure shown in FIG. 3, and the shield electrode is provided on the outer surface of the insulating substrate 30.

Figure 6:
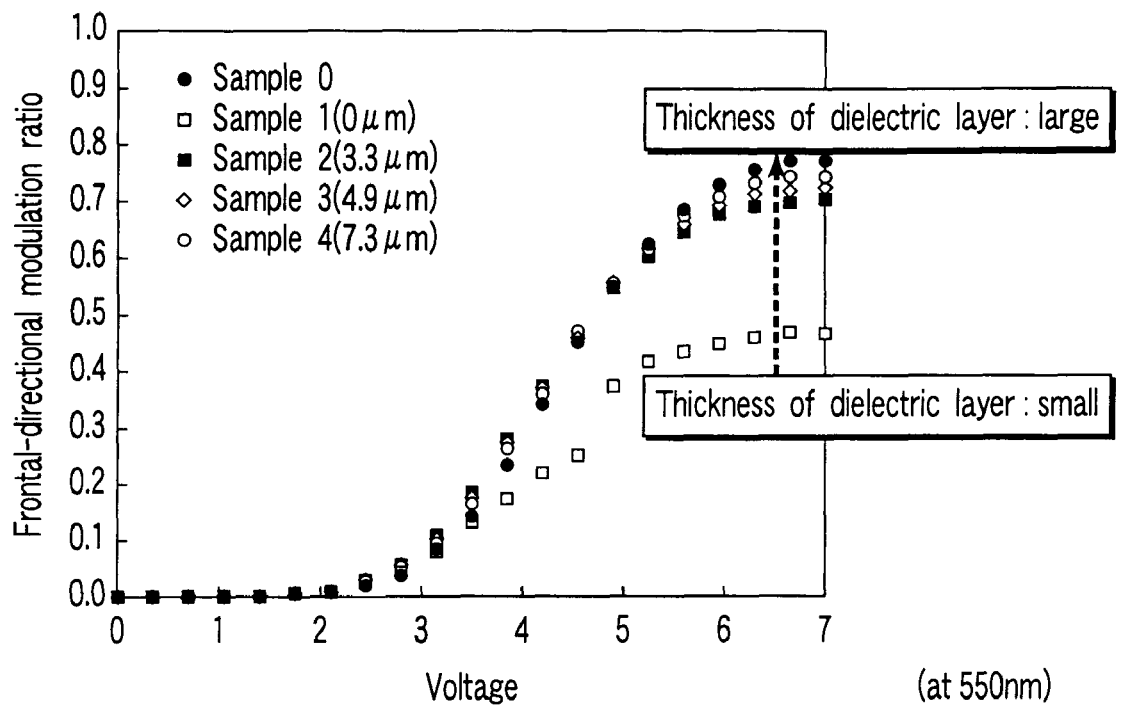
FIG. 6 shows a result of a study on the optimal thickness of a dielectric layer in the third example of structure, and shows a result of measurement of a modulation ratio (transmittance) in a frontal direction of the liquid crystal display panel, relative to an application voltage between a pixel electrode and a common electrode.

FIG. 6 shows the result of the measurement. It is understood that a sufficiently high modulation ratio can be obtained with sample 0. By contrast, in sample 1, only a modulation ratio of about 60% of the modulation ratio of sample 0 was obtained. On the other hand, with respect to samples 2 to 4, it was confirmed that a high modulation ratio (70% or more), which is substantially equal to the modulation ratio of the structure of sample 0 in which the shield electrode is disposed on the outer surface of the substrate, was obtained.

Figure 7:
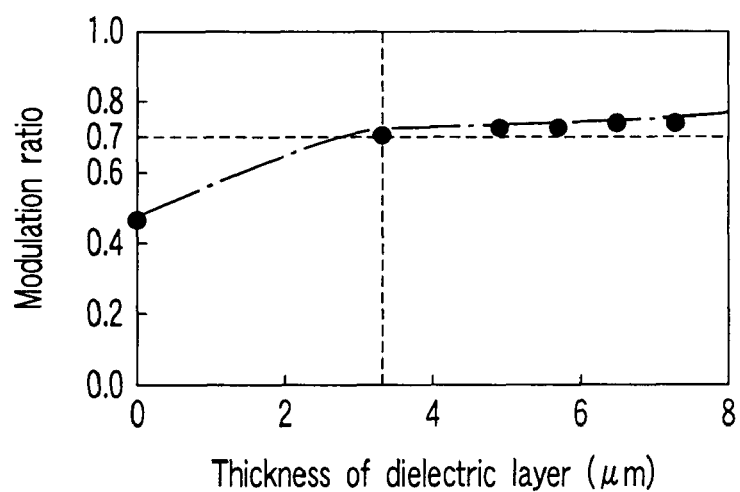
FIG. 7 shows a result of a study on the optimal thickness of a dielectric layer in the third example of structure, and shows a relation of a maximum modulation ratio to the thickness of the dielectric layer.

FIG. 7 shows the relationship between the maximum modulation ratio and the thickness of the dielectric layer DL. From the result shown in FIG. 7, it was understood that an adequate modulation ratio (70% or more) for display can be obtained and the maximum modulation ratio becomes substantially constant. As has been described above, it was confirmed that to set the thickness of the dielectric layer DL disposed between the shield electrode 31 and liquid crystal layer LQ at 3 microns or more is very important in relaxing the influence on the transverse electric field that is generated on the array substrate AR side.

Figure 8:
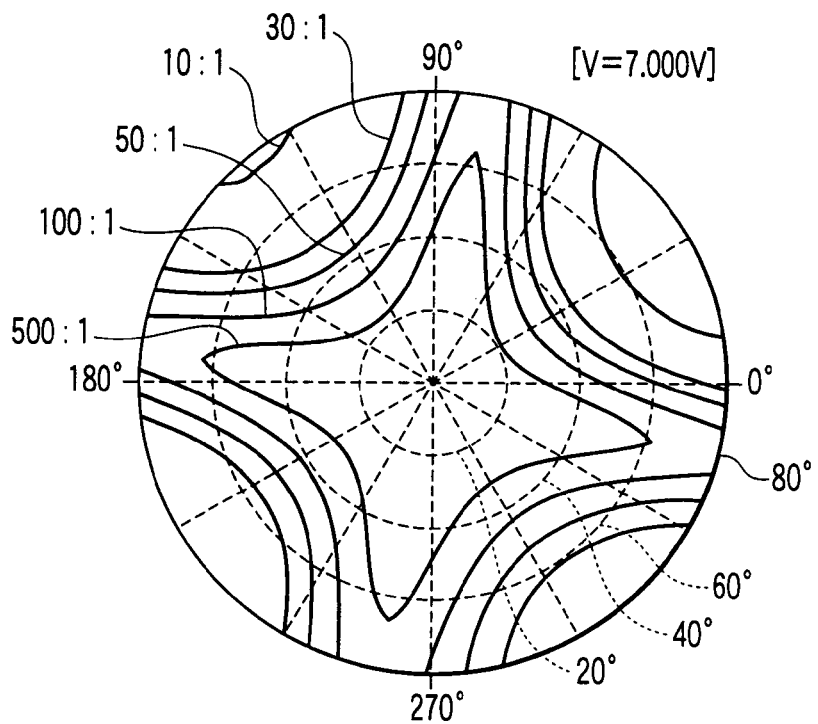
FIG. 8 shows a result of simulation of the viewing angle dependency of a contrast ratio (CR) in the first example of structure.
Figure 9:
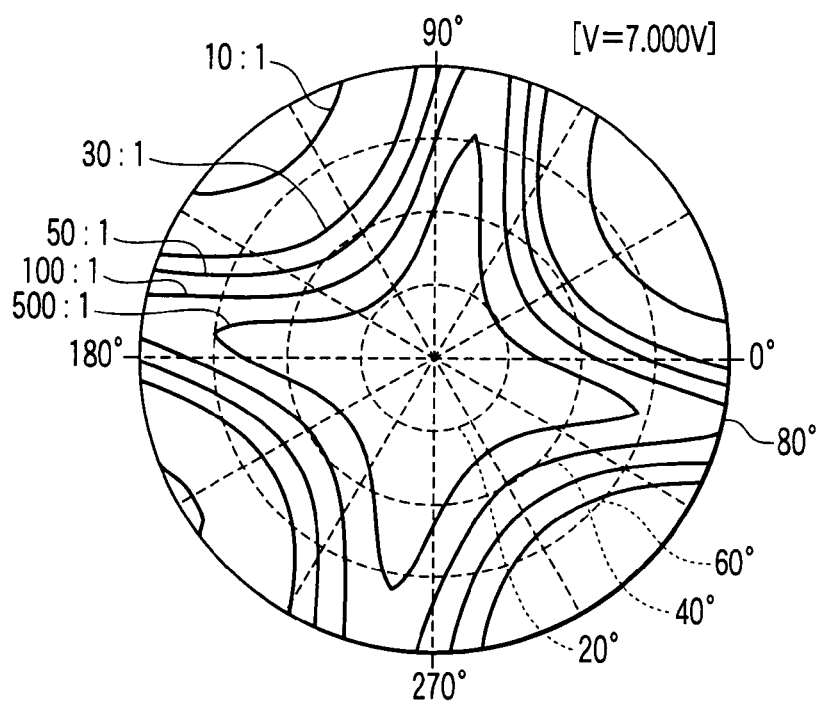
FIG. 9 shows a result of simulation of the viewing angle dependency of a contrast ratio (CR) in the third example of structure.

As regards the liquid crystal display panels according to the first to third examples of structure, the viewing angle dependency of the contrast ratio (CR) at a time when a voltage of (7.0V), by which a maximum modulation ratio is obtained, is applied was simulated. FIG. 8 shows a simulation result of the first example of structure, and FIG. 9 shows a simulation result of the third example of structure. In the simulation, the wavelength of reference light was set at 550 nm.

It is assumed that a 0° azimuth direction corresponds to the right side of the screen, and a 180° azimuth direction corresponds to the left side of the screen. Further, it is assumed that a 90° azimuth direction corresponds to the upper side of the screen, and a 270° azimuth direction corresponds to the lower side of the screen. In FIG. 8 and FIG. 9, the center corresponds to the normal direction of the liquid crystal display panel, and concentric circles defined about the normal direction indicate tilt angles (viewing angles) to the normal direction, and correspond to 20°, 40°, 60° and 80°, respectively. The characteristic diagrams were obtained by connecting regions corresponding to contrast ratios of 10:1, 30:1, 50:1, 100:1 and 500:1 in all azimuth directions.

As shown in FIG. 8 and FIG. 9, it was understood that even in the third example of structure in which the shield electrode is disposed on the inner surface of the insulating substrate, the same viewing angle as in the first example of structure, in which the shield electrode is disposed on the outer surface of the insulating substrate, was realized. It was confirmed that high viewing angle characteristics, which are the feature of the liquid crystal mode that makes use of the transverse electric field, can be maintained by disposing the dielectric layer with sufficient thickness between the shield electrode and the liquid crystal layer in the structure wherein the shield electrode is disposed on the inner surface of the insulating substrate in order to realize the reduction in thickness of the substrate.

As has been described above, according to the liquid crystal display device of the present embodiment, an image with good display quality can be displayed.

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

In the above-described embodiment, the liquid crystal display device of a color display type has been exemplified. As regards liquid crystal display devices of the same color display type, the present invention is also applicable to a so-called color filter on array (COA) structure which includes a color filter on the array substrate side. Similarly, the present invention is applicable to liquid crystal display devices of a black-and-white display type. In the liquid crystal display device of the COA structure or the black-and-white display type, no color filer layer is disposed on the shield electrode 31 in the counter-substrate CT. Thus, the same advantageous effects as in the above-described embodiment can be obtained by disposing an overcoat layer having a desired thickness (e.g. 3 microns or more). In other words, in the counter-substrate CT, the dielectric layer, which is disposed between the shield electrode 31 and liquid crystal layer LQ, mainly corresponds to at least one of the color filter layer and overcoat layer (the thickness of the alignment film 36 is sufficiently smaller than the thickness of these layers and thus ignorable). In addition, by disposing the dielectric layer with a thickness of 3 microns or more in the counter-substrate CT, the shield electrode 31 is sufficiently separated from the transverse electric field that is produced on the array substrate AR side, and the influence on the transverse electric field can be relaxed.

What is claimed is:

1. A liquid crystal display device comprising:

a liquid crystal display panel which is configured to hold a liquid crystal layer between a first substrate and a second substrate, wherein the first substrate includes a first insulating substrate, a switching element which is disposed in association with each of pixels, a common electrode which is common to the pixels, an insulation layer disposed on the common electrode, and a pixel electrode which is connected to the switching element and disposed between the insulation layer and the liquid crystal layer, and the second substrate includes a second insulating substrate, a shield electrode disposed on an inner surface of the second insulating substrate, which is opposed to the liquid crystal layer, a color filter layer which is disposed between the shield electrode and the liquid crystal layer and formed of a resin material, and an overcoat layer which is disposed between the color filter layer and the liquid crystal layer and formed of a resin material.

2. The liquid crystal display device according to claim 1, wherein the shield electrode is grounded or electrically connected to the common electrode.

3. The liquid crystal display device according to claim 1, wherein a sum of a thickness of the color filter layer and a thickness of the overcoat layer is 3 µm or more.

4. The liquid crystal display device according to claim 1, wherein a thickness of the second insulating substrate, which constitutes the second substrate, is 0.1 to 0.5 mm.

5. The liquid crystal display device according to claim 1, wherein the shield electrode is formed of indium tin oxide (ITO) or indium zinc oxide (IZO).

6. The liquid crystal display device according to claim 1, wherein the color filter layer is formed of a polyimide resin material, and the overcoat layer is formed of an acrylic or epoxy resin material.

* * * * *